May 11, 1937. W. D. HARPER 2,080,131
AUTOMOBILE BRAKE RIGGING
Filed June 27, 1934 2 Sheets-Sheet 1
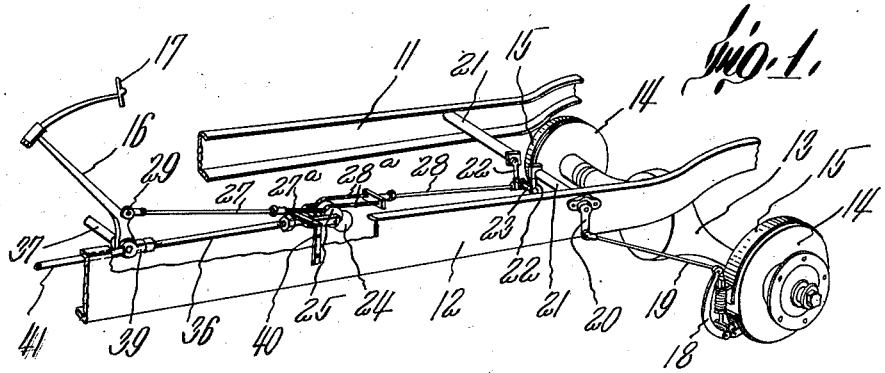

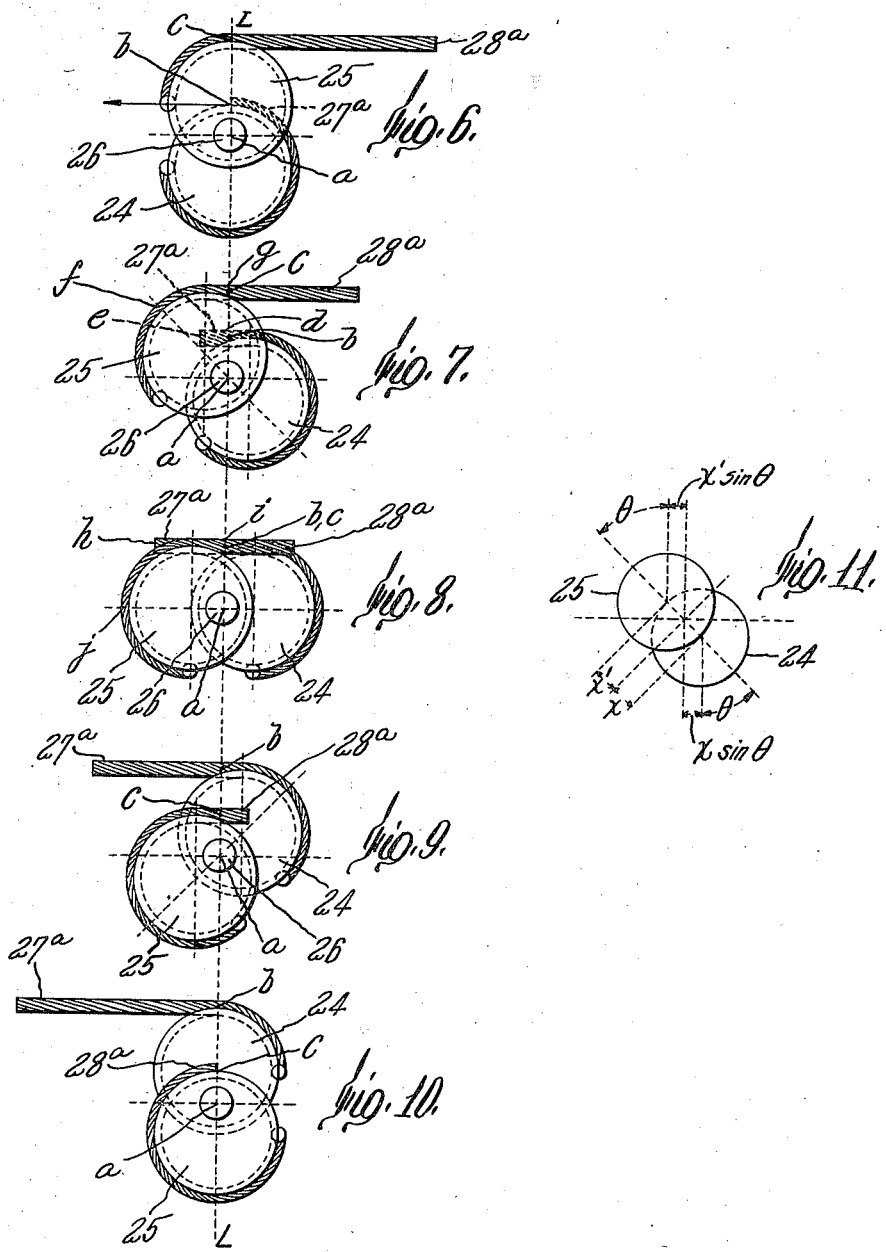

Patented May 11, 1937

2,080,131

UNITED STATES PATENT OFFICE 2,080,131

AUTOMOBILE BRAKE RIGGING

William D. Harper, Wellesley, Mass.

Application June 27, 1934, Serial No. 732,610

13 Claims. (Cl. 74—516)

The present invention is concerned with means for applying or setting the brakes of automobiles, and other wheeled vehicles, both those in which the force available for setting the brakes is the muscular power of a driver or operator, and those where the corresponding force is developed mechanically by the engine, as by creation of a vacuum or a fluid pressure.

An important object of the invention is to provide a force-augmenting mechanical advantage when the brake shoes are in contact position with respect to the complemental drums, so that they can be set with greater force, when severe braking effect is required, than is possible with existing braking apparatus, and may be set in other circumstances sufficiently with only a moderate effort on the part of the operator; and to combine with this effect, the capability for quickly taking up slack or lost motion between the shoes and drums. A related part of this object is to enable the normal throw of the usual brake lever or pedal, or the piston of a suction operated brake applier, or the like to be utilized for taking up all the slack there is in the brake shoes and connections, and then to apply the brakes with powerful leverage; and to do so with a smooth progressive variation of leverage.

A further object is to provide an adjustment to compensate for which may occur in the relationship between the brake shoes and drum, due for instance to relining the brakes, compression or wear of the lining, and the like, and to enable the maximum leverage to be availed of within the range of movement of the brake pedal, under any circumstances.

A further object is to provide a multiplying lever combination which can be applied or inserted in the brake systems of existing automobiles with the minimum of changes or alterations in such systems, and which when installed will provide a power multiplying leverage within the range of movement of the primary brake-applying element.

A means for accomplishing the foregoing and related objects is shown in the drawings furnished herewith and described in the following specification. The invention consists not only in the embodiment so illustrated, but in all substantially equivalent variations and modifications thereof. The nature of the invention can best be explained in connection with the detailed description of this illustrative embodiment.

In the drawings,—

Fig. 1 is a fragmentary perspective view of the chassis of an automobile with its rear wheel brakes and brake operating pedal, and an embodiment of the present invention connected therewith;

Fig. 2 is a plan view of the leverage-varying disc-like elements and flexible tension members of the combination shown in Fig. 1, represented in detached condition and on a larger scale than that of the preceding figure;

Fig. 3 is a side elevation of the parts shown in Fig. 2;

Fig. 4 is a detail cross section taken on line 4—4 of Fig. 3;

Fig. 5 is a diagrammatic elevation showing the leverage multiplying disc-like elements in approximately the position which they occupy for exertion of the maximum mechanical advantage in setting the brakes.

Figs. 6–10 inclusive are diagrams showing successive positions of the disks in the brake setting operation.

Fig. 11 is a diagram explanatory of symbols used in the following description.

Like reference characters designate the same parts wherever they occur in all the figures.

In this specification the term "automobile" is intended to include trucks and other commercial vehicles, passenger or pleasure cars of all descriptions, and the like. Hence the specific illustration herein of the chassis of a truck is not intended, nor to be construed, as limiting the scope of the invention with respect to the class of motor vehicles for which, or the details of the brake with which it is to be used.

Referring to Fig. 1, the reference characters 11 and 12 designate the side bars of an automobile truck, 13 the rear axle housing, 14, 14 the brake drums which are attached to the rear wheels (not shown), 15, 15 the brake shoes cooperating with such drums, and 16 the brake applying lever equipped with a pedal 17 which is located conveniently for pressure application by the driver's foot. The parts collectively designated by the characters 18, 19, 20, 21, 22 and 23 represent a conventional type of brake applying mechanism or means, which is usually connected with the brake lever by a tension rod or its equivalent. It is to be remembered that the mechanism thus shown and designated is illustrative or typical of any of the various means for this purpose which are now, or have been, or may be used for that purpose, and is not a limitation as to the type of braking system having a primary brake actuating means and a brake setting means to which the improvement constituting this invention may be applied. So also the specific brake drums and shoes here shown are to be considered as typical of automobile brakes, whether of the external or internal type, and whether the shoes are rigid and mounted on pivots or slides, or are of the flexible band type. Likewise the pedal lever typifies any lever or other element the movement of which initiates brake acting activity, whether it be operated by the muscular effort of the driver through foot or hand, or by mechanical means under control of the driver. For convenient generic definition herein, such lever may be called the "primary brake actuator".

In carrying out the objects of this invention I have provided connected disc-like or pulley elements 24 and 25, 25 pivotally mounted by means of a pivot rod or pin 26. The cam element 24 is connected with the brake lever 16 by means of a tension or draft-member 27, and the discs 25, 25 are connected to the part 23 of the brake setting mechanism by a tension or draft-member 28. The member 27 is coupled by a yoke and pivot pin at 29 with the lever 16, and has a flexible terminal portion 27a which is wrapped partly around the disc 24 and made fast rigidly thereto at the point 30 by any suitable coupling means. As here shown the tension member 27 is a rod and the terminal section thereof is a piece of wire cable connected to the rod by a coupling 31 and lock nut 32 screwed on the threaded end of the rod. A convenient means of anchoring the ends of the cable section 27a is to separate their strands at the ends and run solder among them so as to form enlarged knobs, which are confined in sockets in the disc and coupling respectively.

Similarly the tension element 28 is made as a rod, connected with flexible terminal elements 28a, 28a, by means of a yoke 33 and nut 34; the terminal elements being likewise sections of wire cable each of which is wrapped partially around one of the discs 25, and is secured thereto and to the yoke by means similar to that just described. Two like discs 25 and flexible members 28a are provided, and located on respectively opposite sides of the disc 24, in order to equalize the draft on either side of the latter element and avoid any tipping, canting or binding tendency of the discs on their pivot, or of the latter in its supports, as well as to avoid bending or springing of the anchor rod which will be presently described.

The ends of the pivot rod 26 are mounted in the arms of a yoke or stirrup 35 which is connected by an anchor rod 36 with the pivot shaft 37 on which the brake lever 16 is mounted. Rod 36 is threaded at its end and screwed into the shank of stirrup 35, being secured by a lock nut 38. Its other end is similarly connected to a yoke or stirrup 39, the arms of which embrace the brake lever and receive the pivot shaft or trunnions thereof. Thus the disc-like elements are prevented from being displaced in position under the pull of the tension members which follows from pressing on the brake pedal. They need no other support in the vertical plane than is given by the tension members; for if these members sag under the weight of the disc and anchor rod when the brakes are relaxed, the pull thereby exerted on the tension members 27 and 28 is insufficient to bring the brake shoes into contact with their drums against the resistance of the strong springs which normally hold the shoes free of the drums.

The disc-like elements here shown are substantially circular disks, equal to one another in diameter, grooved on the circumference to contain the cable elements, and eccentrically mounted, with equal eccentricity, at respectively opposite sides of their pivot axis. Also they are rigidly connected or united to one another, preferably by being made as all parts of one integral piece, as a casting or forging of metal, as shown by Fig. 4. As so made, their rotation about the common axis causes either tension member to be withdrawn or unwound from its disc or discs equally with the taking up of the other tension member on the disc or discs whereon the latter is wound, in a semi-rotation from any starting point, the two parts 25, 25 for the convenience of definition may be considered as one disc, and the two cable sections 28a, 28a as one tension element, since they are like one another and operate functionally as one. Also the lever arm through which either tension member acts on its disc, and vice versa, is gradually lengthened, and correspondingly shortened, with progressive movement in the same direction.

These facts are graphically illustrated by Figs. 3 and 5. With the parts in the position in Fig. 3, the tension member 27 acts on the disc assemblage through an effective lever arm, extending between the points $a$ and $b$, and the assemblage acts on the other tension member through a lever arm from $a$ to $c$. When in the position of maximum leverage or mechanical advantage, the line of centers of the discs is brought substantially perpendicular to the tension members, and the lever arm on which the member 27 then acts becomes $a$—$d$ (Fig. 4), and the arm which acts on member 28 becomes $a$—$e$. As arm $a$—$d$ is longer than $a$—$e$, (and may be two, three or more times as long), the muscular force exerted by the operator is multiplied proportionally in setting the brakes. Although in other positions of the disc assemblage the mechanical advantage is not so great (and may even be a negative advantage, as illustrated in Fig. 3), that is no drawback, for at such times the work required of the operator is merely to overcome the brake-relaxing springs. If then the power arm, by which term I mean the effective lever arm (the perpendicular distance $a$—$b$ from the axis to the center of tension member 27a) on which the force of the brake lever or its equivalent is exerted, is shorter than the delivery arm $a$—$c$ (the perpendicular distance from the axis to the tension member or members 28a) which is the effective arm delivering force to the brakes, the movement required to bring the brake shoes against the drums is taken up with a relatively short movement of the brake lever 16. The remainder, which is the major part, of the possible movement of this lever is then available to set the brakes with constantly increasing leverage, by turning the eccentric disc to or near the position shown in Figs. 5 and 10, where the ratio of power arm to delivery arm has its maximum value.

This statement is illustrated graphically by the diagram in Figs. 6-10. The disc assemblage is represented as having dimensions causing it to be rotated through 180°, or slightly more, about its pivot 26 by the full extent of the brake setting movements of the brake pedal or booster piston of a given motor car or truck; and as being so adjusted that the eccentricity of the disks is perpendicular to the line of draft of the tension members when the brakes are fully relaxed (Fig. 6). The ratio of power arm $a$—$b$ to delivery arm $a$—$c$ then has its minimum value. In turning the assemblage through an angle of 45° to the position of Fig. 7, the brake lever draws off a length d—e of the tension member 27a, while the disk 25 takes up a length of tension member 28a equal to the distance along the circumference of this disk and the adjacent tangent from f—g. The length d—e is less than the length f—g because the disks 24 and 25 are displaced bodily in relatively opposite directions with respect to a reference plane L—L passing through the axis of rotation perpendicular to the line of draft. In turning 90° from the position of Fig. 6 to that of Fig. 8, a length h—i of the tension member 27a is let off from disk 24 and a length of the tension member 28a equal to the arcuate and tangential distance from j—i is taken up on disk 25. In this position the effective power and delivery arms a—b and a—c are equal. Throughout the second quadrant of rotation, which brings the assemblage to the position of Fig. 10, the power arm is always longer than the delivery arm and its proportional length increases; and the ratio of let off and take up of the respective tension members is reversed; that is, the tension member 27a is withdrawn toward the brake lever more rapidly than the member 28a is displaced endwise.

In shifting from the position of Fig. 6 to that of Fig. 8, the length of cable let off from disk 24 is at any instant equal to the circumferential arc of the angle of rotation less the sine of this angle multiplied by the eccentricity of the disk; and the take up of cable 28a by disk 25 is equal to the circumferential arc corresponding to the same angle plus the sine of the angle multiplied by the eccentricity of disk 25. Expressed in mathematical terms, the withdrawal or let off from disk 24 then is $$\frac{\pi D \theta}{360} - x \sin \theta$$

and the take up on disk 25 is $$\frac{\pi D \theta}{360} + x' \sin \theta$$

where D represents the diameter and $x$ the eccentricity of disk 24, D' the diameter and $x'$ the eccentricity of disk 25, and $\theta$ the angle through which the disk assemblage has turned about its axis.

In turning through the next quadrant, through the position of Fig. 9 to that of Fig. 10, the drawn off length of member 27a in any position is equal to $$\frac{\pi D \theta}{360} + x \sin \theta$$

and the take up of member 28a is $$\frac{\pi D' \theta}{360} - x' \sin \theta$$

The lengths of the tension members extending to left and right of the reference line L—L in Figs. 6–9 are drawn to scale to show graphically the relative amounts of take up and let off in the several positions represented. If D equals D' and $x$ equal $x'$ (which is the condition here represented), the total let off and take up are equal to one another in the course of any angle of rotation, the limits of which are symmetrical with respect to the reference plane L—L, whether such angle is 180°, or a greater or less angle; as shown by a comparison of Fig. 6 with Fig. 10 and of Fig. 7 with Fig. 9.

The capacity for adjustment of the apparatus permits the disk assemblage to be located, when the brakes are relaxed, in any position between those of Figs. 6 and 8, wherein the ratio of power arm a—b to delivery arm a—c is less than unity, and from which in rotation to the position of Fig. 10 the value of such ratio increases to the maximum. In practice the disks are preferably so related to one another as to circumference, eccentricity and symmetry on opposite sides of the pivot axis, and are so adjusted when the brakes are relaxed, that the leverage increase (by which I mean increase in the numerical value of the ratio of power arm to delivery arm) operates throughout the initial range of movement and until such leverage increase has reached its maximum. As is made clear by the diagrams, there is a progressive increase of leverage throughout two successive quadrants of rotation from the position of Fig. 6, and through one quadrant from the position of Fig. 8; and thereafter a further range of movement is permitted by virtue of the continuing regular curvature of the disks. The extent of such further range is dependent on the anchorage points of the tension members to the respective disks, and may be 30° or more beyond the position of maximum leverage.

Capacity for adjustment is afforded between the respective tension members 27, 28 and their flexible terminals, and likewise between the anchor rod and its terminal stirrups, in a measure sufficient to compensate for all practical adjustments of the brakes which give them greater or less lost motion between relaxed and binding positions, and to enable the position of maximum mechanical advantage of the disc-like elements to be brought within the movement range of the brake pedal. This is an important feature. The position which the disc-like elements may take when the brakes are released is unimportant. It may be that shown in Fig. 3, or a different position.

The new factors of the invention so far described can be installed in existing automobiles by simply removing the pivot of the brake lever, applying the yoke 39 of the anchor rod to embrace this lever and reinserting the pivot, and connecting the tension members 27 and 28 to the brake actuating means and brake setting means in place of the original tension rod, and by the same means already provided. Or a section may be removed from the middle of the original tension rod and the ends of its separated parts threaded for connection with the couplings 31 and 33. This is accomplished without making even the least structural change in the automobile. Alternatively, the anchor rod may be applied to the equalizer bar (i. e., the bar 21 shown in Figure 1) of the brake setting mechanism, or to some conveniently located part of the chassis or body; provided the point of attachment is such that the rod will extend substantially or nearly in parallel or alignment with the line of draft.

An arrangement which places the anchor point of the anchor rod at the side of the eccentrically disposed discs toward the primary brake actuator, as here shown, is preferred to other possible arrangements, since this permits an anchor rod of minimum stiffness and weight to be used. In such a situation the stress applied to the anchor rod during the maximum brake applying effort is a tensile stress, wherefor the rod need be strong enough only to sustain such stress with safety, and stiff enough to prevent bending or buckling under the smaller compressive stress applied in taking up the slack of the brakes (i. e., while the effective lever arm typified as a—b in Figure 3 is shorter than the effective lever arm typified by a—c).

These conditions make possible the use of an anchor rod threaded at both ends for adjustable connection with yokes 35 and 39 or the like, and to make adjustments by shifting the pivot of the eccentrically disposed discs through any necessary distance, large or small, by simply screwing the rod into or out of either or both of the yokes.

While for most installations the before described apparatus is complete and operative without anything more, yet there are some situations where a stop device of some kind is needed to prevent lifting of the anchor rod and discs under the pull applied by the primary actuator. Such a situation arises when the release of the brakes allows the discs to assume a position substantially the reverse of that shown in Fig. 5, i. e., with the shortest radius of the element 24 adjacent to the tension member 27a, and the longest radius of disc 25 adjacent to the member 28a. Then, and particularly if the anchor rod 36 makes a relatively large angle with the tension member 27, the pull exerted by the latter may lift the discs bodily instead of rotating them about pivot 26, and prevent the brake applying advantage previously described from being obtained. Various mechanical expediencies for preventing such lifting of the discs may be provided. One such consists of a bracket or lug 40 shown in Figs. 1 and 3, provided with a base which may be bolted to the nearer side bar of the chassis and formed to extend thence over the stirrup 35, or some other part of the compression rod near the cams. Or an equivalent finger or stop may be mounted on a cross bar of the chassis over the stirrup and arranged to project downward far enough to prevent its being lifted. Another alternative is to provide an extension arm 41 on the anchor rod which extends forward from the brake lever pivot into a position to bear on an adjacent part of the engine, or its mounting, or the part of the chassis to which the engine is secured. Or the finger of lug may be carried by the stirrup 35 or an adjacent part of the anchor rod arranged to abut on the chassis with the same effect. The application of such a stop or obstructor requires at the most no more alteration of the existing automobile structure than to drill a hole at a near point in the chassis for reception of a securing bolt, while those in alternative forms which comprise a projecting arm carried by the anchor member itself, require nothing whatever to be done to the automobile structure to accommodate them.

What I claim and desire to secure by Letters Patent is:

1. The combination of an automobile braking system having a primary brake actuating means and a brake setting means, of a plurality of operatively connected eccentrically disposed discs in parallel planes, one of said discs being coupled to one of said brake means, another of said discs being coupled to the other of said brake means, means attached to the automobile to support said discs between the primary brake actuating means and the brake setting means, and means including the relationship of said discs, whereby the leverage increase operates throughout the initial range of movement and a further range of operation is permitted after the leverage increase has reached its maximum.

2. The combination of an automobile braking system having a primary brake actuating means and a brake setting means, of a plurality of operatively connected eccentrically disposed discs in parallel planes, one of said discs being coupled to one of said brake means, two others of said discs being arranged at respectively opposite sides of the precedently named disc and being coupled to the other of said brake means, means attached to the automobile to movably support said discs between the primary brake actuating means and the brake setting means, and means including the relationship of said discs, whereby the leverage increase operates throughout the initial range of movement and a further range of operation is permitted after the leverage increase has reached its maximum.

3. The combination of an automobile braking system having a primary brake actuating means and a brake setting means, of a plurality of operatively connected eccentrically disposed discs in parallel planes, one of said discs being coupled to one of said brake means, another of said discs being coupled to the other of said brake means, an anchor member attached to the automobile and connected with the discs, and means including the relationship of said discs, whereby the leverage increase operates throughout the initial range of movement and a further range of operation is permitted after the leverage increase has reached its maximum.

4. The combination of an automobile braking system having a primary brake actuating means and a brake setting means, of a plurality of operatively connected eccentrically disposed discs in parallel planes, one of said discs being coupled to one of said brake means, two others of said discs being arranged at relative opposite sides of the precedently named disc and being coupled to the other of said brake means, an anchor member adjustably attached to the automobile and connected with the discs, and means including the relationship of said discs, whereby the leverage increase operates throughout the initial range of movement and a further range of operation is permitted after the leverage increase has reached its maximum.

5. In an automobile braking system having a primary brake actuating means and a brake setting means, of a plurality of operatively connected eccentrically disposed discs in parallel planes, a tension member for coupling one of said discs with one of said brake means, a tension member for coupling at least two others of said discs with the other of said brake means the last-named discs being at respectively opposite sides of the precedently named disc, an anchor rod, a yoke in connection with one end of said rod, a pivot for said discs mounted in said yoke, and a supporting yoke in connection with the opposite end of said rod for attachment to the automobile, said anchor rod being adjustably connected to one of said yokes in a manner permitting extension or contraction of the distance between the yokes.

6. In an automobile braking system having a primary brake actuating means, a brake setting means, of a plurality of operatively connected eccentrically disposed discs in parallel planes, a tension member coupling one of said discs with one of said brake means, a tension member coupling at least two others of said discs with the other of said brake means the last-named discs being at respectively opposite sides of the precedently named disc, an anchor rod, a yoke in connection with one end of said rod, a pivot for said discs mounted in said yoke, and a supporting yoke in connection with the opposite end of said rod movably attached to the automobile, said anchor rod being adjustably connected to one of said yokes in a manner permitting extension or contraction of the distance between the yokes.

7. The combination of an automobile braking system having a primary brake actuating means and a brake setting means, of a plurality of operatively connected eccentrically disposed discs in parallel planes, one of said discs being connected to one of said brake means, another of said discs being connected to the other of said brake means, and means to support said discs on the automobile, said discs adapted to rotate on an axis transverse to their planes in a position between the primary brake actuating means and the brake setting means, and means including the relationship of said discs, whereby a leverage increase operates throughout the initial range of movement, and a further range of operation is permitted after the leverage increase has reached its maximum.

8. In an automobile braking system, the combination with the primary brake applying lever, the supporting pivot for said lever, and the brake setting means, of an anchor member coupled to said supporting pivot, operatively connected eccentrically disposed discs in planes parallel to one another pivotally supported by said anchor member at a distance from said supporting pivot, and tension members extending in opposite directions from different ones of said discs to coupled connections with said brake applying lever and said brake setting means.

9. The combination of an automobile braking system having a primary brake actuating means and a brake setting means, of a plurality of operatively connected discs in parallel planes, two of said discs being concentric with one another, and eccentric to a third disc disposed between said concentric disc, means attached to the automobile to support said discs between the primary brake actuating means and the brake setting means, a tension member coupling one of said discs with one of said brake means, a tension member coupling at least two others of said discs with the other of said brake means, said tension members being adapted to extend in one direction from the concentric discs and in substantially the opposite direction from said third disc, said disc supporting means including a pivot to which all of the discs are eccentric, and the discs being operatively arranged so that initial movement of the primary brake operating means effects a rapid take up of the brake setting means, and further movement of the primary means causes application of the brake with increasing leverage.

10. The combination of an automobile braking system having a primary brake actuating means and a brake setting means, of a plurality of operatively connected eccentrically disposed discs in parallel planes, means coupling one of said discs with one of said brake means, means coupling at least two others of said discs with the other of said brake means, means attached to the automobile to support said discs between the primary brake actuating means and the brake setting means, and means including the relationship of said discs, whereby the leverage increase operates throughout the initial range of movement and a further range of operation is permitted after the leverage increase has reached its maximum.

11. The combination of an automobile braking system having a primary brake actuating means and a brake setting means, of a plurality of operatively connected eccentrically disposed discs in parallel planes, one of said discs being coupled to one of said brake means, at least two others of said discs being coupled to the other of said brake means, means attached to the automobile to support said discs between the primary brake actuating means and the brake setting means, and means including the relationship of said discs, whereby the leverage increase operates through the initial movement and at least one full quadrant of rotation before reaching the maximum, and a further range of operation is permitted after reaching the maximum leverage.

12. The combination of an automobile braking system having a primary brake actuating means and a brake setting means, of a plurality of operatively connected eccentrically disposed discs in parallel planes, one of said discs being coupled to one of said brake means, another of said discs being coupled to the other of said brake means eccentric to both discs, means attached to the automobile to support said discs rotatably between the primary brake actuating means and the brake setting means, and means including the relationship of said discs, whereby the initial movement of said primary actuating means through a minor fraction of its range of movement takes up the free movement of the brake setting means, and the further movement of the primary means operates through the discs with increasing leverage and decreasing take up to exert braking force through said brake setting means.

13. The combination with an automobile braking system having a primary brake actuating means and a brake setting means, of an assemblage of discs pivotally mounted in a location between the said brake means, said assemblage comprising discs equally eccentric on opposite sides of the pivot axis, equal to one another in dimensions and periphery, and symmetrically arranged on opposite sides of the axis, a tension member extending from one of said discs to the primary brake actuating means, a second tension member extending from the disc or discs at the opposite side of the pivot axis to the brake setting means in a line substantially parallel to the first tension member, and the disc assemblage being arranged with respect to the tension members so as to transmit force from the primary actuating means to the brake setting means with a greater take up of the second tension member than let off of the first tension member during the first part of the movement of the primary actuating means, and vice versa during the last part of such movement, and with progressively increasing leverage.

WILLIAM D. HARPER.